United States Patent [19]

Campbell et al.

[11] 4,293,688

[45] Oct. 6, 1981

[54] POLYAMIDES OF 1,4-CYCLOHEXANE DICARBOXYLIC ACID AND 5-METHYL-1,9-NONANEDIAMINE AND FIBERS THEREOF

[75] Inventors: Robert W. Campbell; H. Wayne Hill, Jr., both of Bartlesville, Okla.

[73] Assignee: Phillips Petroleum Co., Bartlesville, Okla.

[21] Appl. No.: 393,493

[22] Filed: Aug. 31, 1973

[51] Int. Cl.² .............................................. C08G 69/26
[52] U.S. Cl. ....................................... 528/346; 8/516; 260/33.4 R; 260/37 N; 264/176 F; 528/338; 528/339; 528/345; 528/349
[58] Field of Search ...................................... 260/78 R

[56] References Cited

U.S. PATENT DOCUMENTS

| | | | |
|---|---|---|---|
| 2,752,328 | 6/1956 | Magat | 260/78 R |
| 2,965,616 | 12/1960 | Caldwell et al. | 260/78 R |
| 3,575,935 | 4/1971 | Elam | 260/78 R |

*Primary Examiner*—Harold D. Anderson

[57] ABSTRACT

A new polyamide composed at least primarily of 1,4-cyclohexane dicarboxylic acid and 5-methyl-1,9-nonanediamine, the polyamide having less than 5 olefinic double bonds per 100 diamine units, an inherent viscosity of at least about 0.6, a polymer melt temperature of at least about 200° C., a $T_g$ in the range of about 90° to about 130° C., and a $T_m$ in the range of about 260° C. to about 310° C. can be formed into fibers without the use of plasticizers. Such fibers can be produced with a boiling water shrinkage of less than 30 percent.

18 Claims, No Drawings

POLYAMIDES OF 1,4-CYCLOHEXANE DICARBOXYLIC ACID AND 5-METHYL-1,9-NONANEDIAMINE AND FIBERS THEREOF

This invention relates to novel polyamides and to fibers prepared from such polyamides.

U.S. Pat. No. 2,752,328 discloses a linear terephthalamide polymer prepared with 5-methyl-1,9-nonanediamine. However, the patentee states that this polyamide has zero strength temperatures which are undesirably low for most textile uses, and that it is exceedingly water-sensitive and shrinks excessively in hot water. The only 5-methyl-1,9-nonanediamine terephthalate polyamide for which actual data are given in the patent is described in Example II and Table I as having a boiling water shrinkage of 78 percent, a zero strength temperature of 160° C., and a tenacity of 1.9 grams/denier. The patentee further states that in order to obtain satisfactory linear terephthalamide polymers it is critical that the diaminoalkane utilized must have a methy-substituted hydrocarbon chain of 6 to 8 carbon atoms in length with the total number of carbon atoms in the diaminoalkane not exceeding the value obtained by substracting the number of methyl groups from 10. The patentee also states that it was desirable, if not essential, to have a plasticizer for the polymer present during the polycondensation reaction and even during spinning for some of the polymer. The patentee apparently utilized 50 parts of o-hydroxydiphenyl per 110 parts of the salt as a plasticizer during the polycondensation reaction for the terephthalamide polymer of 5-methyl-1,9-nonanediamine.

We have now discovered a linear polymer having desirable values of boiling water shrinkage, dyeability, crease recovery, wash-wear properties, and tenacity can be prepared with 5-methyl-1,9-nonanediamine and 1,4-cyclohexane dicarboxylic acid. Linear as used herein is meant to refer to polymer which is fusible and soluble in common solvents for polyamides, e.g., m-cresol, formic acid, etc.

Accordingly, it is an object of the present invention to provide a new and improved normally solid polymer of 5-methyl-1,9-nonanediamine and 1,4-cyclohexane dicarboxylic acid. Another object of the invention is to provide a fiber from a polymer of 5-methyl-1,9-nonanediamine having commercially acceptable values of boiling water shrinkage, dyeability, crease recovery, wash-wear properties, and tenacity. A further object of the invention is to provide a new and commercially useful linear polyamide fiber. Yet another object of the invention is to provide a new linear polyamide useful for molding. Other objects, aspects and advantages of the invention will be apparent from a study of the specification, the drawings, and the appended claims to the invention.

The polymers of the present invention are linear polymers composed at least primarily of recurring structural units of the formula

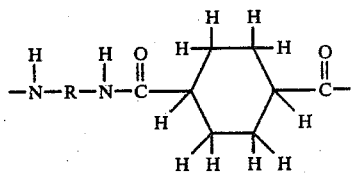

(I)

wherein R is selected from the group consisting essentially of 5-methylnonamethylene, 2,4-dimethyloctamethylene, and 2,4,6-trimethylheptamethylene, with at least 50 percent, more preferably at least 70 percent, and more preferably at least 80 percent of the R's being 5-methylnonamethylene. Polymers consisting of recurring units derived solely from 5-methyl-1,9-nonanediamine and 1,4-cyclohexane dicarboxylic acid are considered to have useful properties. Although it is within the contemplation of the invention for the polymer to contain up to 20 weight percent of other recurring structural units, the polymer will generally have at least 90 weight percent, preferably at least 95 weight percent, and more preferably at least 98 weight percent, of its recurring structural units in the form defined by formula I. Linear polymers consisting essentially of the units defined by formula I as the sole recurring unit are considered to be particularly useful. When other recurring units are present in the polymer as a result of monomeric impurities being present in the preparation of the salt, such other recurring units will generally have the formula

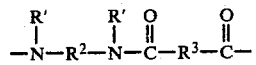

wherein each R' is independently selected from the group consisting of hydrogen and alkyl radicals having from 1 to 4 carbon atoms per radical, $R^2$ is a divalent hydrocarbon radical having from 6 to 16 carbon atoms, and $R^3$ is a divalent hydrocarbon radical having from 4 to 14 carbon atoms. For example, in the preparation of the saturated $C_{10}$ diamines having from 7 to 9 carbon atoms in the chain by the reaction of acrylonitrile and isobutylene and the subsequent hydrogenation of the reaction product, incomplete hydrogenation will permit the diamine product to contain olefinic materials such as 5-methyl-4-nonenediamine, 2,4-dimethyl-4-octenediamine, 2,4-dimethyl-3-octenediamine, and 2,4,6-trimethyl-3-heptenediamine. Such olefinic materials being present during the polycondensation reaction results in a polyamide having olefinic double bonds. It is a feature of the present invention that the presence of such olefinic double bonds in the polyamide is minimized, at least to the extent of having less than 5 olefinic double bonds per 100 R groups in the polyamide. In preferred embodiments of the invention, the polyamide will contain less than about 1 olefinic double bond per 100 R groups and more preferably less than about 1 olefinic double bond per 1000 R groups. Also the utilization of solvents such as methanol and ethanol with some reduction catalysts appears to result in N-alkylated $C_{10}$ diamines.

The recurring units of formula II can also be present as a result of deliberate addition of other diamines, dicarboxylic acids, or salts for the purpose of producing a copolymer. Thus diamines such as hexamethylenediamine, octamethylenediamine, nonamethylenediamine, decamethylenediamine, hexadecamethylenediamine, 1,4-cyclohexanediamine, 1,4-bis(aminomethyl)cyclohexane, bis(4-aminocyclohexy)methane, or alkyl substituted versions thereof can be employed along with various dicarboxylic acids such as adipic acid, suberic acid, azelaic acid, sebacic acid, dodecanedioic acid, hexadecanedioic acid, 1,4-terephthalic acid, 1,4-cyclohexane dicarboxylic acid, or 1,1,3-trimethyl-5-carboxy-3-(p-carboxyphenyl)indane. In lieu of, or in addition to, polymer units as represented in formula II, recurring units such as those obtained by polymerization of amino acids and/or lactams can be present. The end groups on the polymer can be varied as desired by employing various amounts of excess acid or excess diamine, or by adding known additives such as monofunctional acids.

The presently preferred normally solid, resinous polyamides of 1,4-cyclohexane dicarboxylic acid and either 5-methyl-1,9-nonanediamine or an admixture of 5-methyl-1,9-nonanediamine, 2,4-dimethyl-1,8-octanediamine and 2,4,6-trimethyl-1,7-heptanediamine will have an inherent viscosity (as measured at 30° C. in a m-cresol solution having a polymer concentration of 0.5 gram/100 milliliters solution) of at least 0.6, more preferably at least 0.65 and for fiber applications most preferably in the range of about 0.7 to about 1.2. These presently preferred polyamides will also generally have a polymer melt temperature of at least about 200° C., preferably in the range of about 225° to about 290° C., a $T_g$ of at least 90° C., preferably in the range of about 90° to about 130° C., and more preferably in the range of about 100° to about 125° C., a $T_m$ of at least 260° C., preferably in the range of about 270° to about 310° C. and more preferably in the range of about 280° to about 300° C. The polymers can be produced in the absence of any plasticizers, and as employed for fibers, will generally have less than 2 weight percent, preferably less than 0.5 weight percent, based on the weight of the fiber, of any plasticizers for the polymer. Such polymers which are at least essentially free of any plasticizers for the polymer have been found to be particularly useful for fibers as the presence of plasticizers generally lowers $T_g$, reduces crystallinity, and increases the boiling water shrinkage of the fiber. However, if desired, a plasticizer can be incorporated into the polymer and/or fiber by suitable techniques.

These polyamides can be prepared by first forming and optionally recovering the salt, followed by charging the salt to a polycondensation reactor, or the diamine and dicarboxylic acid can be charged directly to the polycondensation reactor and the salt formed in situ. It is presently preferred to obtain the highly saturated diamines from the hydrogenation of the corresponding unsaturated dinitriles under conditions resulting in the desired level of saturation of the diamine product, thereby minimizing the expense of extensive separation techniques. Production of the polyamides preferably is conducted in a polymerization process in which the temperature is maintained at or below about 330° C.

The normally solid, resinous polyamides of the invention can be employed as molding resins, but have been found to be of particular interest in the formation of fibers. Utilizing these polyamides, fibers having a boiling water shrinkage of less than 30 percent are readily produced. The presently preferred fiber of these polyamides have a boiling water shrinkage of less than 25 percent, and a tenacity of at least 2 grams per denier. The fibers are preferably drawn to a length at least 3 times, and more preferably at least 3.5 times, the original quenched length, to achieve desirable characteristics. If desired, the drawn fiber can be annealed to further reduce the boiling water shrinkage.

The following examples are presented in further illustration of the invention, but should not be constructed in unde limitation thereof.

EXAMPLE I

Into a glass flask equipped for the two-way passage of nitrogen was charged 3.4436 grams(20 millimoles) of 1,4-cyclohexane dicarboxylic acid (Eastman practical grade) and 3.4460 grams (20 millimoles) of a diamine mixture consisting of about 89 wt. % 5-methyl-1,9-nonanediamine and 11 wt. % 2,4-dimethyl-1,8-octanediamine. The system was pressured with 10 psig nitrogen and slowly evacuated a total of three times to remove air. The system was closed off under 10 psig nitrogen and heated in the following manner:

| Time, minutes | Temperature, °C. | Comments |
| --- | --- | --- |
| 60 | 25–210 | heated at substantially even rate |
| 60 | 210–280 | heated at substantially even rate |
| 30 | 280–320 | resulting 20 psig pressure was reduced to 17 psig |
| 60 | 320 | the pressure was vented to further reduce pressure and remove water formed during the reaction |
| 60 | 320 | system was flushed with nitrogen |
| 60 | 320 | heating maintained substantially constant under a 30 mm Hg pressure, then the flask was cooled |

The flask broke on cooling. The polymer melt temperature (PMT) was determined to be 285° C. The crystalline melting point ($T_m$) was found to be 270° C. and the glass transition temperature ($T_g$) was determined to be 100° C. The polymer melt temperature was determined in the manner described in Sorenson and Campbell, "Preparative Methods of Polymer Chemistry," (1961) Interscience Publishers, Inc., New York. The other properties were determined by differential thermal analysis of polymer premelted at 300° C. and quenched. These properties indicated that fibers spun from such a polyamide should possess superior properties.

EXAMPLE II

To a 1-liter stirred stainless steel autoclave was charged 124.92 grams (0.7259 moles) of 1,4-cyclohexane dicarboxylic acid (Eastman practical grade), 125.0 grams (0.7529 moles) of a diamine mixture consisting of 88.5 wt. % 5-methyl-1,9-nonanediamine and 11.5 wt. % of 2,4-dimethyl-1,8-octanediamine, 0.44 gram (1.0 mole %) glacial acetic acid, 0.0112 gram (0.00525 wt. %) of manganese lactate, 0.6585 gram of titanium dioxide powder and 62.6 ml of distilled water. Air was removed from the autoclave by alternately evacuting and pressuring with 60 psig nitrogen a total of 4 times. The system was closed off under 60 psig nitrogen and heated in the following manner:

| Time, minutes | Temperature °C. | Comments |
|---|---|---|
| 30 | ~25–210 | heated at substantially uniform rate |
| 60 | 210 | temperature maintained substantially constant |
| 30 | 210–310 | heated at substantially uniform rate |
| 60 | 310 | temperature maintained substantially constant |
| 30 | 310 | vent slowly to atmospheric pressure |
| 30 | 310 | slow nitrogen purge |
| 30 | 310 | pressure slowly reduced to 20 mm Hg |
| 45 | 310 | pressure maintained substantially at 20 mm Hg |

Stirring was commenced 105 minutes into the run. Autogenous pressure conditions were maintained during the first 3 hours by venting as necessary to maintain 400 psig. 81 ml of water was collected during the process.

The autoclave was repressured to about 20–30 psig with nitrogen, the outlet plug at the bottom was removed and the polymer was extruded into an aqueous bath. The aqueous bath contained pieces of dry ice to provide a layer of carbon dioxide from the autoclave outlet to the surface of the bath. The polymer was light tan in color. The $TiO_2$ was unevenly distributed as much of it came out in the initial portion of the extrudate. The polymer was ground in a Wiley mill and dried in a vacuum oven at about 80° with a slight, periodic sweep with nitrogen to assist in removal of the water. The resulting polymer had an inherent viscosity of 0.95 as measured at 30° C. in a m-cresol solution containing 0.5 wt. % of the polymer. Differential thermal analyses of polymer which had been premelted at 310° C. and quenched revealed a glass transition temperature ($T_g$) of 110° C., a crystallization temperature ($T_c$) of 240° C. and a crystalline melting point ($T_m$) of 287° C. These determinations of $T_g$, $T_c$ and $T_m$ were conducted in an inert atmosphere, and the heating rate of the quenched samples was 10° C. per minute.

EXAMPLE III

The polyamide produced in Example II, identified hereinafter as Polyamide A, was melt spun and drawn into fibers in the absence of any plasticizer in the following manner: The polymer in chip form was dried at 100° C. under vacuum for about 18 to 24 hours just prior to spinning, about 15 grams of polymer was charged while warm to the nitrogen-purged ⅝ inch diameter barrel of a piston extruder. Polymer was extruded at the rate of one cubic centimeter per minute through a six-hole spinneret die. The spinning temperature was 330° C. The extruded multifilament was air-cooled by downward passage through a four-inch diameter, four-foot long glass pipe. It was then taken around a hysteresis brake to a Godet roll driven at about 280 feet per minute and finally to a constant tension winder. Two spins were made, the yarn was two-plied and drawn 4.75 to 1 in contact with an 8-inch heated plate at 115° C. and taken up on a constant tension winder. Boiling water shrinkage and other properties were determined from the resulting yarn. The results are shown in the following table in comparison with yarns prepared at approximately similar spinning and drawing conditions from a polyamide formed from about equal molar ratios of terephthalic acid and 5-methyl-1,9-nonanediamine concentrate (Polyamide B) and nylon-6,6 (Polymide C).

TABLE

| Polyamide | A | B[a] | C[b] |
|---|---|---|---|
| $T_g$, °C. | 110 | 108 | 45 |
| $T_m$, °C. | 287 | 250 | 265 |
| Inherent viscosity[c] | 0.95 | 0.91 | nd |
| Spin Temp. °C. | 330 | 305 | 265 |
| Draw Temp. °C. | 115 | 125 | 100 |
| Draw Ratio | 4.75 | 3.5 | 5 |
| Fiber Properties, As Drawn | | | |
| Denier[d] | 50/12 | 32.6 | 16.5 |
| Tenacity, gpd[e] | 3.1 | 2.0 | 5.6 |
| Elongation, % | 11.4 | 53 | 26 |
| Initial Modulus, gpd[e] | 29.7 | 35 | 42 |
| Boiling Water Shrinkage, % | 22.2 | 15.4 | 13.7 |
| Fiber Properties, After Boiling[g] | | | |
| Tenacity, gpd[e] | 2.0 | 1.8 | 4.9 |
| Elongation, % | 41.8 | 59 | 36 |
| Initial Modulus, gpd[e] | 20.9 | 23 | 44 |

[a]Diamine comprised 90.29 wt. % 5-methyl-1,9-nonanediamine, and 8.44 wt. % 2,4-dimethyl-1,8-octanediamine.
[b]Commercial fiber grade nylon-6,6 (Chemstrand 10V).
[c]Measured at 30° C as 0.5 wt. % polyamide in m-cresol.
[d]Polyamide A yarn was a 12-filament yarn having a total denier of 50. The other polyamide fibers were monofilaments.
[e]ASTM D 2256-69, using an optional rate of elongation of 100% per minute.
[f]Procedure used was as follows: A loop of fiber or yarn was made having a circumference of 1.8-2 meters with ends tied together. The loop was hung on a hook at the top of a vertical meter stick. A weight of 1.2 grams was placed on a hook at the bottom of the loop, after which the length of the loop was measured. The loop was then removed from both hook and wound into a coil having a diameter of about 2 inches. The coil was folded in cheesecloth and immersed in boiling water for 15 minutes. The coil and cheesecloth were removed from the boiling water, and the coil was removed from the cheesecloth and unwound. The loop was then placed on the hook on the meter stick, the weight was placed on a hook at the bottom of the loop, and the length of the loop was measured again. Boiling water shrinkage (%) equals original length of loop minus length of loop after boiling water treatment divided by original length of loop times 100.
[g]Boiled in water as in footnote f.

Inspection of the data show that the polyamide of the instant invention possesses a substantial advantage in melting point over the comparison polymers. This advantage is expected to be reflected in improved wash-wear properties and less critical ironing temperature requirements combined with satisfactory tenacity properties for textiles prepared from fibers spun from the polyamide. The high $T_g$ of Polyamide A, similar to that of Polyamide B, suggests that fabrics prepared from either resin will have similar crease resistance properties and other properties accruing from high $T_g$ values.

A knit prepared from the yarn of Polyamide A was dyed at boil for 1 hour with 1.5% on weight of fiber with Celanthrene Fast Blue 2G (Color Index Disperse Blue 7). A K/S value of 14.1 at 620 millimicrons was measured indicating good dyeability. The color determination was made employing a colorant mixture computer devised by Davidson & Hemmendinger, an analogy instrument employing the Hubelka-Munk K/S function.

Reasonable variations and modifications are possible within the scope of the foregoing disclosure and the appended claims to the invention.

That which is claimed is:

1. A normally soild, resinous polyamide with at least 80 weight percent thereof being composed of primary recurring structural units of the formula

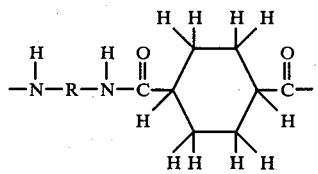

wherein the R in each of at least 50 percent of said primary recurring structural units is 5-methylnonamethylene, and the R in each of the balance, if any, of said primary recurring structural units is individually selected from the group consisting of 2,4-dimethyloctamethylene and 2,4,6-trimethylheptamethylene; the balance, if any, of the recurring structural units of said polyamide having the formula

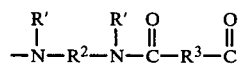

wherein each R' is individually selected from the group consisting of hydrogen and alkyl radicals having from 1 to 4 carbon atoms per radical, each $R^2$ is a divalent hydrocarbon radical having from 6 to 16 carbon atoms, and each $R^3$ is a divalent hydrocarbon radical having from 4 to 14 carbon atoms; said polyamide containing less than 5 olefinic double bonds per 100 R groups.

2. A polymeric composition comprising a polyamide in accordance with claim 1, wherein said polymeric composition contains less than 0.5 weight percent, based on the weight of said polyamide, of plasticizer for said polyamide, and wherein at least 90 weight percent of said polyamide consists of said primary recurring structural units.

3. A polyamide in accordance with claim 1, wherein said polyamide is a linear polymer having an inherent viscosity in the range of about 0.6 to about 1.2 as measured at 30° C. in a m-cresol solution having a polyamide concentration of 0.5 gram/100 milliliters solution; and wherein said polyamide has a polymer melt temperature in the range of about 200° to about 290° C., a $T_g$ in the range of about 90° to about 130° C. and a $T_m$ in the range of about 260° to about 310° C.

4. A polamide in accordance with claim 1, wherein said polyamide is a linear polymer consisting essentially of said primary recurring structural units.

5. A polyamide in accordance with claim 4, wherein the R in each of at least 80 percent of the primary recurring structural units is 5-methylnonamethylene.

6. A polyamide in accordance with claim 5 wherein said polyamide has an inherent viscosity in the range of about 0.7 to about 1.2 as measured at 30° C. in a m-cresol solution having a polyamide concentration of 0.5 gram/100 milliliters solution.

7. A polyamide in accordance with claim 6 wherein said polyamide contains less than 1 olefinic double bond per 1000 R groups.

8. A polyamide in accordance with claim 7 wherein said polyamide is essentially free of any plasticizer for said polyamide.

9. A polyamide in accordance with claim 8 wherein said polyamide has a $T_g$ in the range of about 100° to about 125° C., a $T_m$ in the range of about 280° to about 300° C., and a polymer melt temperature in the range of about 225° to about 290° C.

10. A fiber of a normally solid, resinous polyamide with at least 80 weight percent of the polyamide being composed of primary recurring structural units of the formula

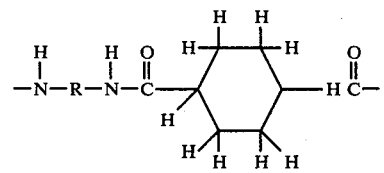

wherein the R in each of at least 50 percent of said primary recurring structural units is 5-methylnonamethylene, and the R in each of the balance, if any, of said primary recurring structural units is individually selected from the group consisting of 2,4-dimethyloctamethylene and 2,4,6-trimethylheptamethylene; the balance, if any, of the recurring structural units of said polyamide having the formula

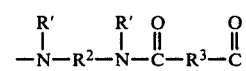

wherein each R' is individually selected from the group consisting of hydrogen and alkyl radicals having from 1 and 4 carbon atoms per radical, each $R^2$ is a divalent hydrocarbon radical having from 6 to 16 carbon atoms, and each $R^3$ is a divalent hydrocarbon radical having from 4 to 14 carbon atoms.

11. A fiber in accordance with claim 10 wherein said polyamide contains less than 5 olefinic double bonds per 100 R groups.

12. A fiber in accordance with claim 10 wherein said fiber has less than 0.5 weight percent, based on the weight of the fiber, of plasticizers for said polyamide, and wherein at least 90 weight percent of said polyamide consists of said primary recurring structural units.

13. A fiber in accordance with claim 10 wherein said polyamide has an inherent viscosity in the range of about 0.6 to about 1.2 as measured at 30° C. in a m-cresol solution having a polyamide concentration of 0.5 gram/100 milliliters solution; and wherein said polyamide has a polymer melt temperature in the range of about 220° to about 290° C., a $T_g$ in the range of about 90° to about 130° C., and a $T_m$ in the range of about 260° to about 310° C.

14. A fiber in accordance with claim 10 wherein said fiber has a boiling water shrinkage of less than 30 percent.

15. A fiber in accordance with claim 10 wherein said polyamide is a linear polymer consisting essentially of said primary recurring structural units, and wherein the R in each of at least 80 percent of the primary recurring structural units is 5-methylnonamethylene.

16. A fiber in accordance with claim 15 wherein said fiber has a boiling water shrinkage of less than 25 percent.

17. A fiber in accordance with claim 16 wherein said polyamide has an inherent viscosity in the range of about 0.7 to about 1.2 as measured at 30° C. in a m-cresol solution having a polyamide concentration of 0.5 gram/100 milliliters solution, wherein said fiber is essentially free if any plasticizer for said polyamide, and wherein said polyamide contains less than 1 olefinic double bond per 1000 R groups.

18. A fiber in accordance with claim 15 wherein said polyamide has a $T_g$ in the range of about 100° to about 125° C., a $T_m$ in the range of about 290° to about 300° C., and a polymer melt temperature in the range of about 225° to about 290° C.

* * * * *

UNITED STATES PATENT AND TRADEMARK OFFICE
CERTIFICATE OF CORRECTION

PATENT NO. : 4,293,688

DATED : Oct. 6, 1981

INVENTOR(S) : Robert W. Campbell; H. Wayne Hill, Jr.

It is certified that error appears in the above-identified patent and that said Letters Patent is hereby corrected as shown below:

Delete claims 1-18 in their entirety and substitute the following claims:

1. A normally solid, resinous polyamide with at least 80 weight percent thereof being composed of primary recurring structural units of the formula

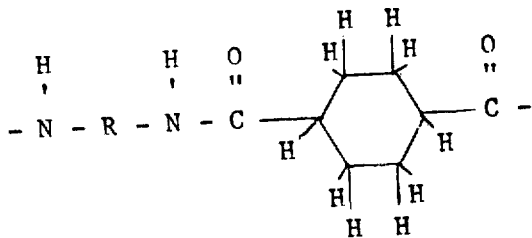

wherein the R in each of at least 50 percent of said primary recurring structural units is 5-methylnonamethylene, and the R in each of the balance, if any, of said primary recurring structural units is individually selected from the group consisting of 2,4-dimethyloctamethylene and 2,4,6-trimethylheptamethylene; the balance, if any, of the recurring structural units of said polyamide having the formula

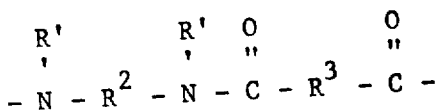

wherein each $R'$ is individually selected from the group consisting of hydrogen and alkyl radicals having from 1 to 4 carbon atoms per radical, each $R^2$ is a divalent hydrocarbon radical selected from the group consisting of 5-methyl-4-nonenylene, 2,4-dimethyl-4-octenylene, 2,4-dimethyl-3-octenylene, 2,4,6-trimethyl-3-heptenylene, hexamethylene, octamethylene, nonamethylene, decamethylene, hexadecamethylene, 1,4-cyclohexylene,

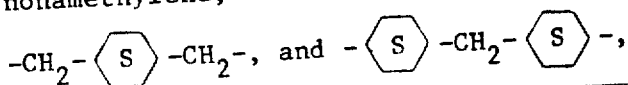

UNITED STATES PATENT AND TRADEMARK OFFICE
CERTIFICATE OF CORRECTION

PATENT NO. : 4,293,688

DATED : Oct. 6, 1981

INVENTOR(S) : Robert W. Campbell; H. Wayne Hill, Jr.

It is certified that error appears in the above-identified patent and that said Letters Patent is hereby corrected as shown below:

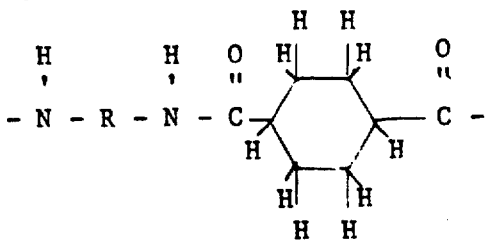, and each $R^3$ is a divalent hydrocarbon radical having from 4 to 14 carbon atoms; said polyamide containing less than 5 olefinic double bonds per 100 R groups; said polyamide having a $T_m$ of at least about 260° C.

2. A fiber of a normally solid, resinous polyamide with at least 80 weight percent of the polyamide being composed of primary recurring structural units of the formula

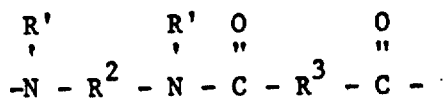

wherein the R in each of at least 50 percent of said primary recurring structural units is 5-methylnonamethylene, and the R in each of the balance, if any, of said primary recurring structural units is individually selected from the group consisting of 2,4-dimethyloctamethylene and 2,4,6-trimethylheptamethylene; the balance, if any, of the recurring structural units of said polyamide having the formula $$-N(R') - R^2 - N(R') - \overset{O}{\underset{\|}{C}} - R^3 - \overset{O}{\underset{\|}{C}} -$$

UNITED STATES PATENT AND TRADEMARK OFFICE
CERTIFICATE OF CORRECTION

PATENT NO. : 4,293,688

DATED : October 6, 1981

INVENTOR(S) : Robert W. Campbell et al.

It is certified that error appears in the above-identified patent and that said Letters Patent is hereby corrected as shown below:

wherein each R' is individually selected from the group consisting of hydrogen and alkyl radicals having from 1 to 4 carbon atoms per radical, each $R^2$ is a divalent hydrocarbon radical selected from the group consisting of 5-methyl-4-nonenylene, 2,4-dimethyl-4-octenylene, 2,4-dimethyl-3-octenylene, 2,4,6-trimethyl-3-heptenylene, hexamethylene, octamethylene, nonamethylene, decamethylene, hexadecamethylene, 1,4-cyclohexylene, $-CH_2-\langle S\rangle-CH_2-$, and $-\langle S\rangle-CH_2-\langle S\rangle-$, and each $R^3$ is a divalent hydrocarbon radical having from 4 to 14 carbon atoms; said polyamide containing less than 5 olefinic double bonds per 100 R groups; said polyamide having a $T_m$ of at least about 260° C.

On the title page, "18 Claims" should read -- 2 Claims --.

Signed and Sealed this

Thirty-first Day of July 1984

[SEAL]

Attest:

GERALD J. MOSSINGHOFF

Attesting Officer

Commissioner of Patents and Trademarks